(12) United States Patent
Prasad et al.

(10) Patent No.: US 9,471,470 B2
(45) Date of Patent: Oct. 18, 2016

(54) AUTOMATICALLY RECOMMENDING TEST SUITE FROM HISTORICAL DATA BASED ON RANDOMIZED EVOLUTIONARY TECHNIQUES

(71) Applicants: Dhanyamraju S U M Prasad, Hyderabad (IN); Satya Sai Prakash K, Hyderabad (IN); Simy Chacko, Hyderbad (IN); Sekhar Ramaraju, Secunderabad (IN); Gopi Krishna Durbhaka, Hyderabad (IN)

(72) Inventors: Dhanyamraju S U M Prasad, Hyderabad (IN); Satya Sai Prakash K, Hyderabad (IN); Simy Chacko, Hyderbad (IN); Sekhar Ramaraju, Secunderabad (IN); Gopi Krishna Durbhaka, Hyderabad (IN)

(73) Assignee: HCL TECHNOLOGIES LTD, Chennai (IN)

( * ) Notice: Subject to any disclaimer, the term of this patent is extended or adjusted under 35 U.S.C. 154(b) by 135 days.

(21) Appl. No.: 14/507,857

(22) Filed: Oct. 7, 2014

(65) Prior Publication Data

US 2015/0378873 A1 Dec. 31, 2015

(51) Int. Cl.
*G06F 11/36* (2006.01)
*G06F 9/44* (2006.01)

(52) U.S. Cl.
CPC ....... *G06F 11/3684* (2013.01); *G06F 11/3688* (2013.01); *G06F 8/71* (2013.01)

(58) Field of Classification Search
CPC ........... G06F 11/3668; G06F 11/3672; G06F 11/368; G06F 11/3688; G06F 8/71
See application file for complete search history.

(56) References Cited

U.S. PATENT DOCUMENTS

| | | | | |
|---|---|---|---|---|
| 4,809,170 A | * | 2/1989 | Leblang | G06F 8/71 707/999.202 |
| 2004/0073890 A1 | * | 4/2004 | Johnson | G06F 11/368 717/124 |
| 2008/0172659 A1 | * | 7/2008 | Yu | G06F 11/368 717/139 |
| 2010/0050156 A1 | * | 2/2010 | Bonanno | G06F 8/443 717/122 |
| 2012/0198421 A1 | * | 8/2012 | Arumugham | G06F 11/368 717/125 |
| 2014/0331205 A1 | * | 11/2014 | Singh | G06F 11/3688 717/124 |

* cited by examiner

*Primary Examiner* — Joseph Schell
(74) *Attorney, Agent, or Firm* — VKM Law Group

(57) ABSTRACT

Disclosed herein are a system and a method for automated test suite optimization and recommendation, based on historical data, using randomized evolutionary techniques. The system analyzes historical data pertaining to file change pattern and test case execution history to identify test cases that match application being tested. Further, based on the test cases identified, the system generates optimized test suite recommendations to the user.

13 Claims, 5 Drawing Sheets

AUTOMATICALLY RECOMMENDING TEST SUITE FROM HISTORICAL DATA BASED ON RANDOMIZED EVOLUTIONARY TECHNIQUES

The present application is based on, and claims priority from, Indian Complete Application number 3073/CHE/2014 filed on 25 Jun. 2014, the disclosure of which is hereby incorporated by reference herein.

TECHNICAL FIELD

The embodiments herein relate to software testing and, more particularly, to optimized test suite recommendation in software testing.

BACKGROUND

Testing of a software application is the process of executing test cases to check and ensure whether all functions of the application are working in a desired manner. It is generally a mandatory process to ensure quality of the product being launched to the market. Often, even after testing, almost all applications produce bugs of different kinds. Users may provide feedbacks indicating possible occurrence of bugs. In that case, the developers have to make sufficient code changes to fix the bugs. In a different scenario, most of the application developers keep on improving their products by adding new features and by removing certain features; and modified application is launched as new version of the application already available in the market.

In either scenario, code change happens and it is responsibility of testing team to test the new application for errors/bugs. However, thousands of test cases may be required to test complex applications. Issue is that even if the application has undergone minor changes and only a few files are modified/changed, the testing team is required to run all test cases, which is a cumbersome and time consuming process. Main reason why all test cases needs to be executed even for minor code changes is that to ensure overall stability of the product. Additionally, it is not easy nor a norm/practice to identify/define test cases pertaining to a file change.

To handle this issue especially time and resources are constrains, a process known as "test suite optimization" is followed by the testing team in which sophisticated mechanisms are used for identifying test case related to a particular code/file change. However, disadvantage of existing systems used for test suite optimization is that they require user intervention at different levels of processing and typically misses to use the rich historical evidences, by confining to current release specifications and changes. Another disadvantage of these systems is that since output completely depends on inputs provided by the user, quality of output may vary based on experience, skill, and knowledge of the user who is providing inputs to the system.

SUMMARY

In view of the foregoing, an embodiment herein provides a method of automated test suite recommendation for an application. In this method, at least one input related to the application is collected using an automated test suite recommendation module. Further, based on a historical data, at least one test case which matches the collected input is identified. Further, based on all test cases identified to be matching with the inputs, an optimized test suite is recommended to the user.

Embodiments further disclose a system for automated test suite recommendation for an application. The system collects at least one input related to said application using an automated test suite recommendation system. Further, at least one test case is identified based on a historical data, wherein said at least one test case matches said collected input using said automated test suite recommendation system. Further, based on all test cases which are identified to be matching with the inputs, the automated test suite recommendation system provides test suite recommendation to a user.

Embodiments herein also disclose a computer program product for automated test suite recommendation for an application. The product comprising of an integrated circuit comprising at least one processor and at least one memory having a computer program code within said circuit. The memory and said computer program code with said at least one processor cause said product to collect at least one input related to said application. Further, based on a historical data, at least one test case is identified which matches collected input. Further, based on all test cases which are identified to be matching with the inputs, a test suite recommendation is provided to the user.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
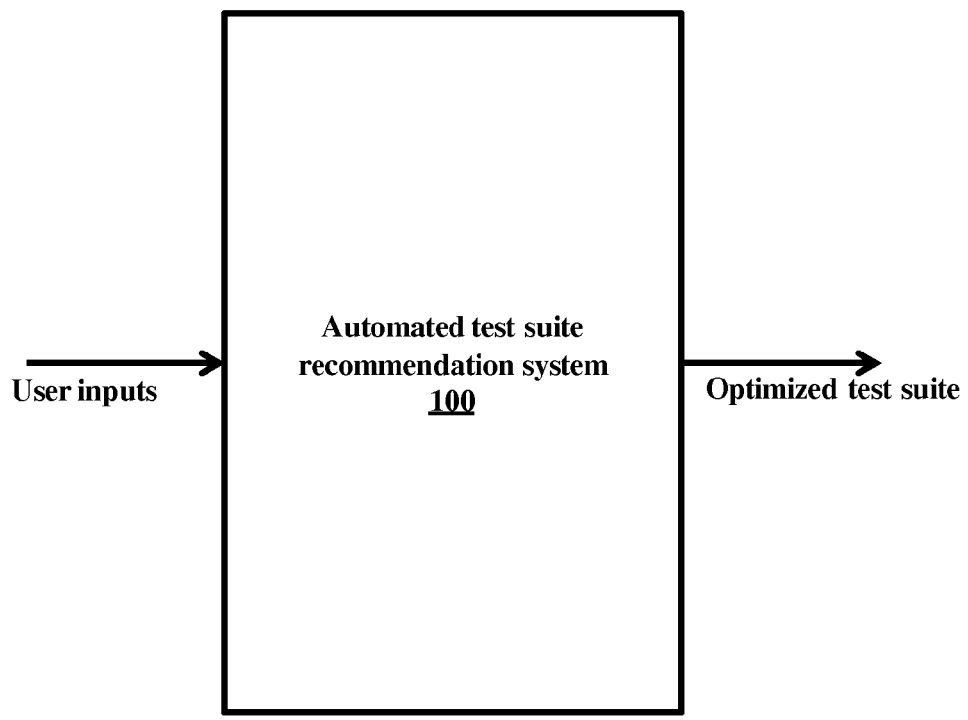
FIG. 1 illustrates a block diagram of automated test suite recommendation system, as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a means for test suite recommendation by generating an optimized test suite. Referring now to the drawings, and more particularly to FIGS. 1 through 5, where similar reference characters denote corresponding features consistently throughout the figures, there are shown embodiments.

FIG. 1 illustrates a block diagram of automated test suite recommendation system, as disclosed in the embodiments herein. When a software application is modified (i.e. when a new build of an application is developed), the automated test suite recommendation system 100 can be used to identify test cases which are to be executed corresponding to the changes made in the application, and generate an optimized test suite which comprises of the identified test cases. In a preferred embodiment, the automated test suite recommendation system 100 may be used to automatically provide the test suite recommendation based on a given set of inputs.

In a preferred embodiment, the automated test suite recommendation system 100 identifies test cases required for the test suite recommendation based on historical data. Suitable database mining tools/algorithms may be used by the automated test suite recommendation system 100 to identify at least one test case that match given inputs, and which is sufficient to test changes in the current build of application being tested.

Upon identifying test case (s) which matches input data, the automated test suite recommendation system 100 provides recommendation to the user in the form of an optimized test suite, wherein the optimized test suite comprises of all test cases identified by the automated test suite recommendation system 100 as relevant with respect to inputs provided by the user.

Figure 2:
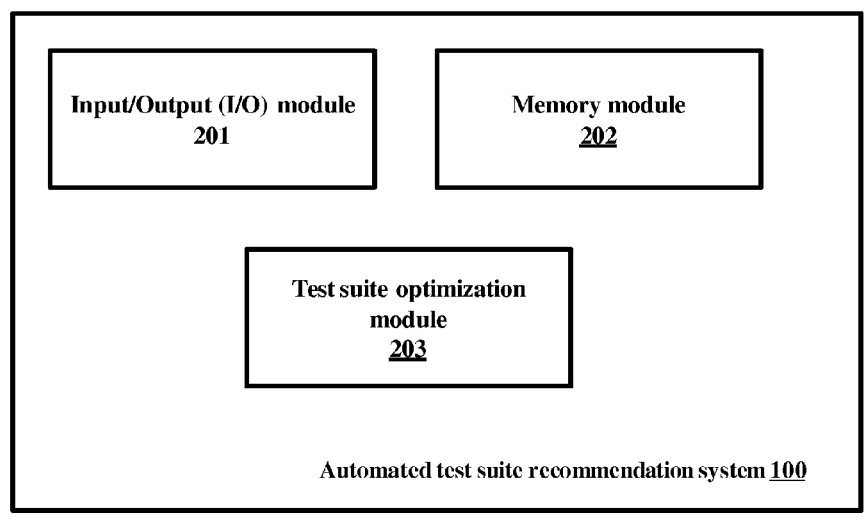
FIG. 2 is a block diagram which depicts components of the automated test suite recommendation system, as disclosed in the embodiments herein.

FIG. 2 is a block diagram which depicts components of the automated test suite recommendation system, as disclosed in the embodiments herein. The automated test suite recommendation system 100 comprises of an Input/Output (I/O) module 201, a memory module 202, and a test suite optimization module 203. The I/O module 201 is used to collect inputs from user, as well as for providing test suite recommendations to the user. The I/O module 201 may use any suitable hardware and/or software means, and communication technologies/interfaces to effectively receive inputs and provide outputs.

The memory module 202 may possess historical information such as, but not limited to test execution matrix, and file change matrix. The memory module 202 may also store input data collected, and corresponding test suite recommendations generated over a period of time, for future reference. The memory module 202 may possess means for automatically updating historical data dynamically based on each input received, and corresponding recommendations generated by the system. The memory module 202 may further possess means for updating the historical data based on inputs provided by a user, using a suitable interface. In another embodiment, the information stored in the memory module may be arranged in the form of databases.

The test suite optimization module 203, by processing the inputs, identifies test cases that match the given inputs. Further, based on the identified test cases, test suite recommendation is provided to the user. In a preferred embodiment, the test suite optimization module 203 identifies test cases that match the user input, based on historical data which is accessed from the memory module 202. Further, based on the identified test cases that match the input query, the test suite optimization module 203 generates recommendations, which are provided to the user using the I/O module 201.

Figure 3:
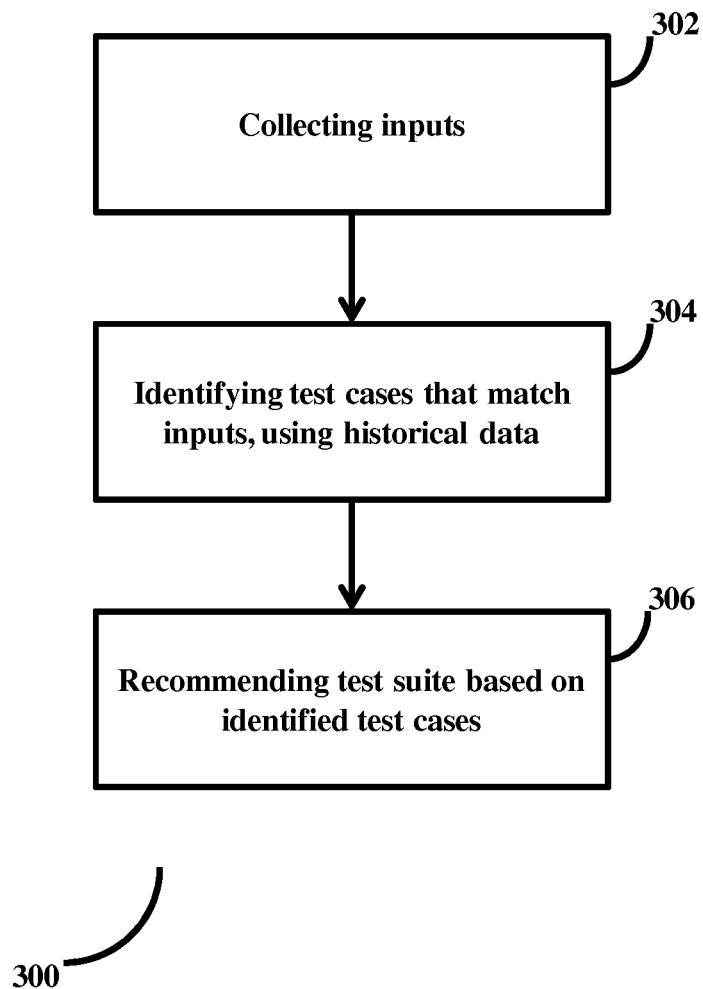
FIG. 3 is a flow diagram which depicts steps involved in the process of optimized test suite recommendation, as disclosed in the embodiments herein.

FIG. 3 is a flow diagram which depicts steps involved in the process of optimized test suite recommendation, as disclosed in the embodiments herein. The automated test suite recommendation system 100 collects (302) inputs required for the optimized test suite recommendation purpose. Inputs collected may comprise of a test execution matrix, file change matrix, and information related to change (s) made to the application/software (which needs to be tested) in comparison with at least one recent build. The system may also collect information related to feature (s) of the application which is changed while modifying and launching latest build of the application. Thus making the system capable of making recommendations based on file change information or alternately feature change information.

Further, the test suite optimization module 203, by processing the inputs, identifies (304) test cases that match the given inputs. In a preferred embodiment, the test suite optimization module 203 identifies test cases that match the user input, based on historical data. The historical data refers to information related to files changed across different builds of the application being tested, and test cases used/changed across each of the builds being considered. Input to the test suite optimization module 203 to initiate test suite optimization may be information related to change (s) made to the application in comparison with at least one recent build, which is a part of the historical data. The historical data analysis process being used by the test suite optimization module 203 involves comparing input data with similar files in each builds being considered so as to identify file change pattern, and identifying corresponding test case/test case changes i.e. test case execution history.

Further, based on the comparison results, the test suite optimization module 203 identifies test cases that match the input query, and generates recommendation (306) based on the identified test cases; which are provided to the user using the I/O module 201. The various actions in method 300 may be performed in the order presented, in a different order or simultaneously. Further, in some embodiments, some actions listed in FIG. 3 may be omitted.

Figure 4:
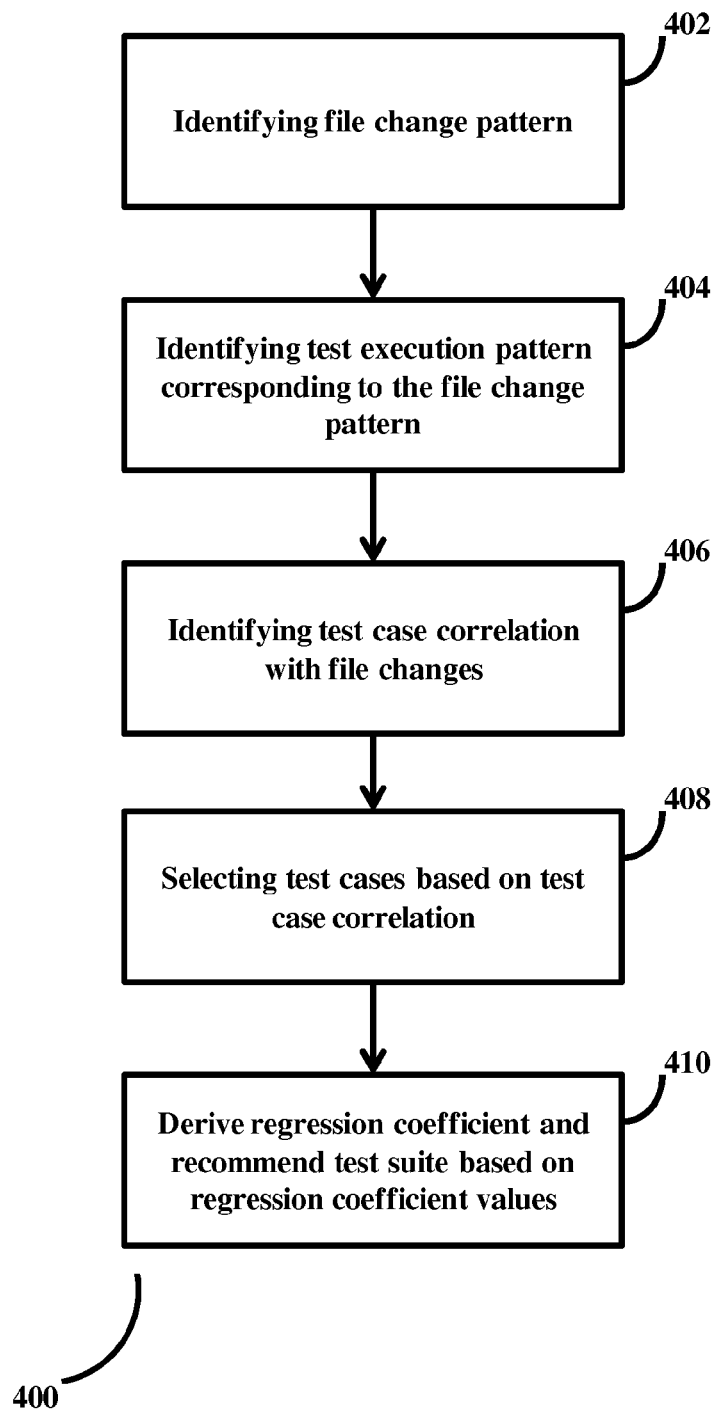
FIG. 4 is a flow diagram which depicts steps involved in the process of identifying test cases required for test suite optimization, as disclosed in the embodiments herein.

FIG. 4 is a flow diagram which depicts steps involved in the process of identifying test cases required for test suite optimization, as disclosed in the embodiments herein. Initially, the test suite optimization module 203 identifies (402) file change pattern which indicates the way files changes across different builds of the application being tested. The test suite optimization module 203 identifies the file change pattern by performing database mining of a file change matrix. The file change matrix possesses information related to files associated with each build/version of the application. By comparing the files corresponding to each build, changes made to files may be identified. The files changed across different builds of the application amounts to file change pattern corresponding to that particular application.

Further, the test suite optimization module 203 identifies (404) test execution pattern corresponding to the identified file change pattern. The test execution history provides information about test cases changed corresponding to file change pattern, across different builds of the application. The test suite optimization module 203 identifies the test execution history by performing database mining of a test execution matrix.

Further, based on the file change pattern, and the test execution pattern, the test suite optimization module 203 identifies (406) test case correlation with file change pattern. In a preferred embodiment, the test case correlation data may indicate extent to which a test case is related to each file in the application being tested such that a higher value of test case correlation of a test case may indicate higher probability that particular test case being executed/changed with respect to a file change that is implicitly derived through randomized evolutionary techniques embodying problem specific objective function.

Further, based on the identified test case correlation data, the test suite optimization module 203 selects (408) all test cases that matches the user criteria. For example, the test suite optimization module 203 may choose only those test cases which have higher test case correlation value. In addition to the collected inputs and test case correlation value, the test suite optimization module 203 may use information such as but not limited to pass/failure status of each test case being considered, and type of testing the test case is associated with (such as regression/intermediate testing). For example, the test suite optimization module 203 may consider only those test cases which have a desired success rate, wherein the success rate is calculated/measured as difference between amount of success of the test case and amount of failure of each test case being considered.

Further, the test suite optimization module 203 derives (410) regression coefficients and based on the derived regression coefficients, recommends test suite to the user. The regression coefficient may act as a threshold value for selecting test cases for test suite recommendation. For example, the regression coefficient may be set in terms of pass percentage of test cases such that only those test cases are selected for test suite optimization, which are having a minimum pass percentage value (say 50%). In an embodiment, the test suite optimization module 203 may automatically calculate the regression coefficient value based on a pre-defined parameter such as a desired accuracy level.

In another embodiment, the test suite optimization module 203 may receive feature change as input for test suite optimization. Further, by comparing the received feature change information with at least one database in the memory module 202 that possesses test execution history corresponding to each feature change, the test suite optimization module 203 identifies each test case related to the given feature change. In this scenario, the test suite optimization module 203, based on the identified test cases, identified test case correlation values, and derived regression coefficient, recommends an optimized test suite to the user.

The various actions in method 400 may be performed in the order presented, in a different order or simultaneously. Further, in some embodiments, some actions listed in FIG. 4 may be omitted.

Figure 5:
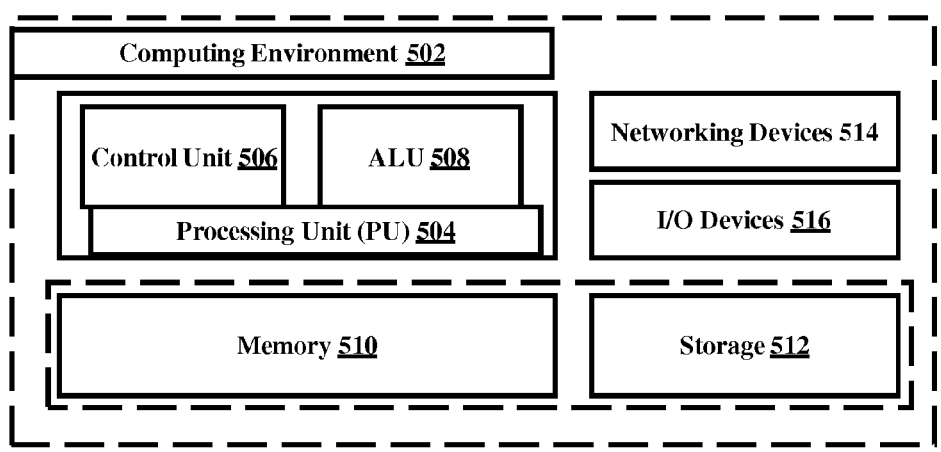
FIG. 5 illustrates a computing environment implementing the method and system, as disclosed in the embodiments herein.

FIG. 5 illustrates a computing environment implementing the method and system, as disclosed in the embodiments herein. As depicted, the computing environment 502 comprises at least one processing unit 504 that is equipped with a control unit 506 and an Arithmetic Logic Unit (ALU) 508, a memory 510, a storage unit 512, plurality of networking devices 514 and a plurality Input output (I/O) devices 516. The processing unit 504 is responsible for processing the instructions of the algorithm. The processing unit 504 receives commands from the control unit 506 in order to perform its processing. Further, any logical and arithmetic operations involved in the execution of the instructions are computed with the help of the ALU 508.

The overall computing environment 502 can be composed of multiple homogeneous and/or heterogeneous cores, multiple CPUs of different kinds, special media and other accelerators. The processing unit 504 is responsible for processing the instructions of the algorithm. Further, the plurality of processing units 504 may be located on a single chip or over multiple chips.

The algorithm comprising of instructions and codes required for the implementation are stored in either the memory unit 510 or the storage 512 or both. At the time of execution, the instructions may be fetched from the corresponding memory 510 and/or storage 512, and executed by the processing unit 504. In case of any hardware implementations various networking devices 514 or external I/O devices 516 may be connected to the computing environment to support the implementation through the networking unit and the I/O device unit.

The embodiments disclosed herein can be implemented through at least one software program running on at least one hardware device and performing network management functions to control the network elements. The network elements shown in FIG. 2 include blocks which can be at least one of a hardware device, or a combination of hardware device and software module.

The embodiments disclosed herein specify a system for automated test suite recommendation. The mechanism allows optimization and recommendation of test suite, providing a system thereof. Therefore, it is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred embodiment using the system together with a software program written in, for ex. Very high speed integrated circuit Hardware Description Language (VHDL), another programming language, or implemented by one or more VHDL or several software modules being executed on at least one hardware device. The hardware device can be any kind of device which can be programmed including, for ex. any kind of a computer like a server or a personal computer, or the like, or any combination thereof, for ex. one processor and two FPGAs. The device may also include means which could be for ex. hardware means like an ASIC or a combination of hardware and software means, an ASIC and an FPGA, or at least one microprocessor and at least one memory with software modules located therein. Thus, the means are at least one hardware means or at least one hardware-cum-software means. The method embodiments described herein could be implemented in pure hardware or partly in hardware and partly in software. Alternatively, the embodiment may be implemented on different hardware devices, for ex. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method of automated test suite recommendation for an application, said method comprising:
    collecting at least one input related to said application, using an automated test suite recommendation system;
    identifying at least one test case based on a historical data, wherein identifying said at least one test case using said automated test suite recommendation system further comprises:
        identifying a file change pattern, wherein said file change pattern indicates a way files have changed across different builds of said application, using said automated test suite recommendation system;
        identifying test execution history corresponding to said identified file change pattern, wherein said test execution history indicates test cases changed according to said file changes across different builds of said application, using said automated test suite recommendation system;
        generating test case correlation value for each test case, based on said file change pattern and said test execution history, using said automated test suite recommendation system;
        selecting at least one test case based on said generated test case correlation value;
        deriving a regression coefficient based on said file change pattern and said test case execution history, using said automated test suite recommendation system; and
        computing test case recommendations based on said selected at least one test case and said regression coefficient, using said automated test suite recommendation system; and
    providing test suite recommendation to a user based on said at least one test case, using said automated test suite recommendation system.

2. The method as in claim 1, wherein said input is at least one of a file change matrix, a test execution matrix, and a test query.

3. The method as in claim 2, wherein said test query is at least one file change information.

4. The method as in claim 2, wherein said test query is at least one feature change information.

5. The method as in claim 1, wherein said file change pattern is identified by executing database mining of a file change matrix.

6. The method as in claim 1, wherein said test execution history is identified by executing database mining of a test execution matrix.

7. A system for automated test suite recommendation for an application, said system comprising:
    a hardware processor; and
    at least one of a memory unit, wherein said at least one of said memory unit comprises a plurality of instructions, said instructions configured to cause said hardware processor to:
        collect at least one input related to said application using an automated test suite recommendation system;
        identify at least one test case based on a historical data, wherein identifying said at least one test case using said automated test suite recommendation system further comprises:
            identifying a file change pattern, wherein said file change pattern indicates a way files have changed across different builds of said application, using a test suite optimization module of said automated test suite recommendation system;
            identifying test execution history corresponding to said identified file change pattern, wherein said test execution history indicates test cases changed according to said file changes across different builds of said application, using said test suite optimization module of said automated test suite recommendation system;
            generating test case correlation value for each test case, based on said file change pattern and said test execution history, using said test suite optimization module of said automated test suite recommendation system;
            selecting at least one test case based on said generated test case correlation value, using said test suite optimization module of said automated test suite recommendation system;
            deriving a regression coefficient based on said file change pattern and said test case execution history, using said test suite optimization module of said automated test suite recommendation system; and
            computing test case recommendations based on said selected at least one test case and said regression coefficient, using said test suite optimization module of said automated test suite recommendation system; and
        provide test suite recommendation to a user based on said at least one test case, using said automated test suite recommendation system.

8. The system as in claim 7, wherein said automated test suite recommendation system is configured to receive at least one of a file change matrix, a test execution matrix, and a test query as input.

9. The system as in claim 8, wherein said automated test suite recommendation system is further configured to receive at least one file change information as said test query.

10. The system as in claim 8, wherein said automated test suite recommendation system is further configured to receive at least one feature change information as said test query.

11. The system as in claim 7, wherein said test suite optimization module is further configured to identify said file change pattern by executing database mining of a file change matrix.

12. The system as in claim 7, wherein said test suite optimization module is further configured to identify said test execution history by executing database mining of a test execution matrix.

13. A computer program product for automated test suite recommendation for an application, said product comprising:
    an integrated circuit comprising at least one processor;
    at least one memory having a computer program code within said circuit, wherein said at least one memory and said computer program code with said at least one processor cause said product to:
        collect at least one input related to said application;
        identify at least one test case based on a historical data, wherein identifying said at least one test case further comprises:
            identifying a file change pattern, wherein said file change pattern indicates a way files have changed across different builds of said application;

identifying test execution history corresponding to said identified file change pattern, wherein said test execution history indicates test cases changed according to said file changes across different builds of said application;

generating test case correlation value for each test case, based on said file change pattern and said test execution history;

selecting at least one test case based on said generated test case correlation value;

deriving a regression coefficient based on said file change pattern and said test case execution history; and computing test case recommendations based on said selected at least one test case and said regression coefficient; and provide test suite recommendation to a user based on said at least one test case.

* * * * *